US012798886B2

(12) United States Patent
Willemin et al.

(10) Patent No.: US 12,798,886 B2
(45) Date of Patent: Nov. 17, 2026

(54) MULTI-DIRECTIONAL CONVEYOR ROLLER

(71) Applicant: Magnum Roller, LLC, Alpena, MI (US)

(72) Inventors: Luke Willemin, Alpena, MI (US); Brian J. Konieczny, Posen, MI (US); Patrick Kelley, Herron, MI (US); Matthew Gies, Alpena, MI (US)

(73) Assignee: Magnum Roller, LLC, Alpena, MI (US)

( * ) Notice: Subject to any disclaimer, the term of this patent is extended or adjusted under 35 U.S.C. 154(b) by 54 days.

(21) Appl. No.: 18/971,563

(22) Filed: Dec. 6, 2024

(65) Prior Publication Data

US 2026/0159328 A1 Jun. 11, 2026

(51) Int. Cl.
*B65G 39/02* (2006.01)
*B65G 13/08* (2006.01)
*B65G 39/04* (2006.01)

(52) U.S. Cl.
CPC ............. *B65G 39/02* (2013.01); *B65G 13/08* (2013.01); *B65G 39/04* (2013.01)

(58) Field of Classification Search
CPC ......... B65G 39/02; B65G 13/08; B65G 39/04
USPC ..................................... 193/35 MD; 198/786
See application file for complete search history.

(56) References Cited

U.S. PATENT DOCUMENTS 1,123,851 A * 1/1915 Cooper .................. B65G 39/09 101/421
1,305,535 A 6/1919 Grabowiecki
1,963,956 A 6/1934 James
3,552,541 A * 1/1971 Riggs ..................... B65G 13/10 198/525

(Continued)

FOREIGN PATENT DOCUMENTS

AT 509167 A1 6/2011
JP 2003160268 A 6/2003

(Continued)

OTHER PUBLICATIONS

The European Search Report for European Application No. EP25170839, dated Sep. 15, 2026, 2 pages.

*Primary Examiner* — Mark A Deuble
(74) *Attorney, Agent, or Firm* — WARNER NORCROSS + JUDD LLP

(57) ABSTRACT

A conveyor roller, either externally driven, manually driven, gravity driven or non-driven, with secondary rolling elements mounted in the core of the conveyor roller to reduce friction of product being moved in a direction contrary to the flow of the conveyor, across the effective face of the roller. The secondary rolling elements are arranged to rotate about axes that are skewed relative to the access of the conveyor roller. All of the rolling elements may be oriented at essentially the same angle. The secondary rolling elements may be incorporated into secondary rolling element assemblies that are readily fitted into openings defined in the core of the conveyor roller. Each assembly may be configured to be (Continued)

snap-fitted into openings in the core. In one embodiment, a pair of secondary rolling element assemblies may be configured to be snap-fitted into the core from opposite sides and to interlock and support one another.

20 Claims, 6 Drawing Sheets

(56) References Cited

U.S. PATENT DOCUMENTS

| | | | | | |
|---|---|---|---|---|---|
| 3,590,970 | A * | 7/1971 | Komnylak | H01H 67/06 193/35 MD |
| 3,789,947 | A | 2/1974 | Blumrich | |
| 3,804,230 | A * | 4/1974 | Krivec | B65G 13/10 198/791 |
| 3,923,150 | A * | 12/1975 | Jager | B65G 39/02 198/780 |
| 3,964,588 | A * | 6/1976 | Kornylak | B65G 47/766 198/786 |
| 4,050,561 | A * | 9/1977 | Seitz | B65G 39/02 193/35 R |
| 7,249,671 | B2 | 7/2007 | Riddick et al. | |
| 8,752,696 | B2 * | 6/2014 | Reidhaar | B65H 9/166 271/226 |
| 10,087,005 | B1 * | 10/2018 | Chiu | B65G 39/10 |
| 11,845,613 | B1 * | 12/2023 | Sadasivan | B65G 39/18 |
| 12,351,397 | B2 * | 7/2025 | Wetters | B65G 13/10 |

FOREIGN PATENT DOCUMENTS

| | | | |
|---|---|---|---|
| JP | 2023088450 | A | 6/2023 |
| KR | 20220005669 | A | 1/2022 |
| WO | 2024046758 | A1 | 3/2024 |

* cited by examiner

MULTI-DIRECTIONAL CONVEYOR ROLLER

BACKGROUND OF THE INVENTION

The invention relates to roller conveyors that transport products down the length of the conveyor, either forward or backwards, using power driven rollers, manually driven rollers, or gravity driven rollers. In many material-handling applications it is necessary to move products laterally or in a direction other than the primary direction of conveyor flow across the width of the conveyor, either while the conveyor system is in motion or stationary. The sliding friction between the product and roller effective surface must be overcome to move the products in any direction other than the primary direction of travel. Manually handling products to overcome lateral friction can result in injury to workers. Excessive lateral force on the rollers can result in damage to the roller bearings and conveyor side frames. Existing solutions rely on a combination of a plurality of short conveyor rollers and multi-directional wheels mounted to a common axle. The number of individual components involved make this option expensive. This solution is also ineffective due to excessive axle deflection resulting from multiple components being supported by a single axle. As a result, there remains a long-felt and unmet need for a conveyor roller that facilitates movement of products in directions other than the primary direction of travel.

SUMMARY OF THE INVENTION

The present invention overcomes the shortcomings of the prior art by providing a conveyor roller with secondary rolling elements, mounted within the effective conveying surface and extending above the outer conveying surface of the roller, to reduce the force required to move product across the conveyor width either while the conveyor system is in motion or stationery.

In one embodiment, the conveyor roller includes a shaft, a shell and may also include one or more bearings that rotatably support the shell on the shaft. A plurality of secondary rolling elements are mounted within and extend above the outer surface of the shell. The plurality of secondary rolling elements are oriented to rotate about an axis that is not parallel to the axis of the conveyor roller. In one embodiment, all of the secondary rolling elements rotate about axes that are complementary to one another in the sense that they facilitate movement of a product in a common direction distinct from the primary direction of travel associated with the axis of rotation of the conveyor roller. For example, the secondary rolling elements may be arranged at substantially the same angle relative to the axis of rotation of the conveyor roller. The number and arrangement of rolling elements may vary from application to application.

In one embodiment, the present invention includes a plurality of self-contained rolling element assemblies. Each rolling element assembly may include a housing, a shaft and a rolling element. The shaft is rotatably mounted within the housing to provide a support structure for the rolling element. If desired, opposite ends of the shaft may be supported by bearings or bushing that facilitate rotation of the shaft. The rolling element is mounted to and rotates with the shaft. In alternative embodiments, the shaft may be fixed within the housing and the rolling element may be mounted to the shaft, potentially on bearings or bushings that facilitate rotation of the rolling element about the shaft.

In one embodiment, each secondary rolling element assembly is mounted within the shell of the conveyor roller. The housing of each secondary rolling element assembly may be configured to closely fit into openings in the shell.

In one embodiment, the housing is configured to be snap-fitted into place within corresponding openings in the shell. In one embodiment, the housing includes a pair of protrusions configured to be fitted into and interlock with the shell. The housing and/or the protrusions may be manufactured from a material that is sufficiently flexible and resilient to allow the protrusions to flex inwardly while being fitted through the openings, but spring back outwardly to interlock.

In one embodiment, the secondary rolling elements are arranged about the conveyor roller in a pattern selected to maintain the structural integrity of the shell. For example, the secondary rolling elements may be arranged in rows that extend about the circumference of the conveyor roller, and each row may be longitudinally offset from the adjacent row (or rows) so that the secondary rolling elements of one row do not overlap along a circumferential path with the secondary rolling elements of the adjacent row (or rows) of secondary rolling elements.

The present invention provides an effective and durable conveyor roller assembly that facilitates movement of conveyed products in directions other than the direction associated with the axis of rotation of the conveyor roller. The present invention addresses both the cost and strength shortcomings of the existing solutions by including the secondary rolling elements within the tube core of the roller. This reduces the overall cost of the assembly while also improving strength by relying on a single rigid tube as the primary load supporting element. The use of secondary rolling element assemblies that snap into place facilitate assembly, repair and replacement. It also allows different types of secondary rolling element to be interchangeably mounted to a given conveyor roller, for example, to adapt to different products or to changes in the conveyor paths.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and are being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION

Figure 1:
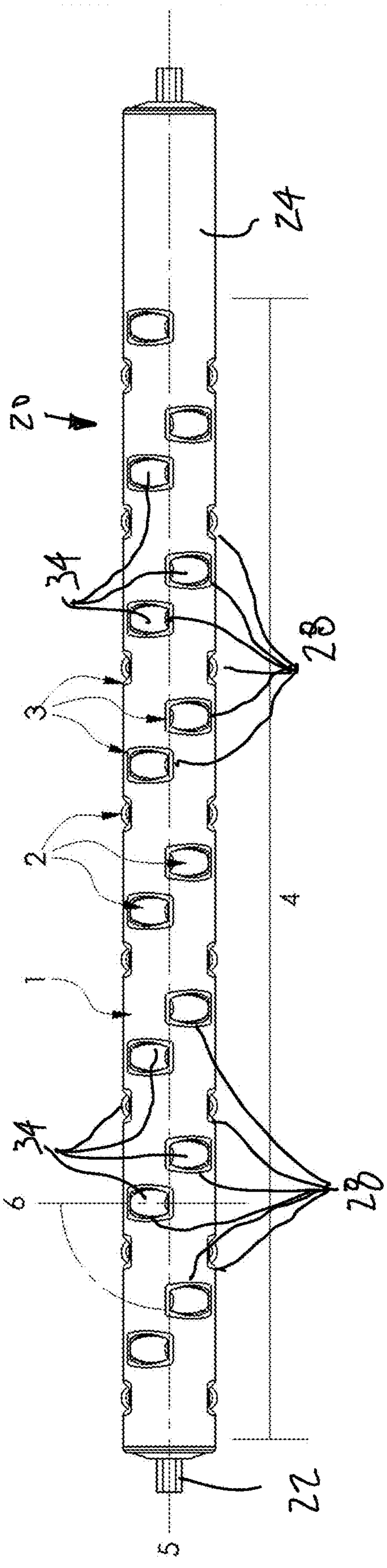
FIG. 1 is a top view of a multi-directional roller in accordance with one embodiment of the present invention.
Figure 2:
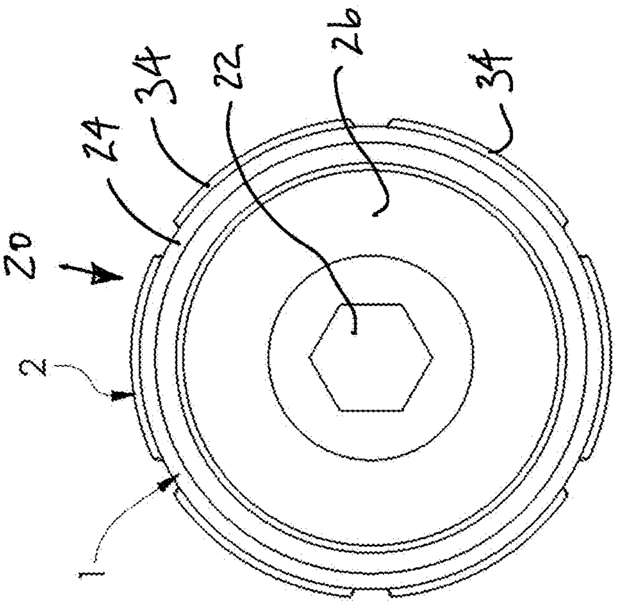
FIG. 2 is a front view of the multi-directional roller.

FIG. 1 shows a first embodiment of the present invention which features a conveyor roller 20 with a plurality of rolling elements 2 mounted into the roller core 1 in a pattern arranged around the circumference and length of the effective width of the roller 4. The conveyor roller 20 is configured to rotate about a primary axis 5 to allow supported product to move in a direction perpendicular to the primary axis 5. In the illustrated embodiment, each rolling element 2 is oriented with a rotational axis 6 perpendicular to the primary axis (or rotational axis 5 of the conveyor roller core 1). As shown in FIG. 2, the rolling elements 2 are positioned to sit at or above the outer surface of the conveyor roller 20 so that they will engage with products supported on the conveyor roller 20. The number, size, shape and arrangement of rolling elements may vary from application to application.

The present invention is described and illustrated in the context of one type of conventional conveyor roller 20, but it may be incorporated into a wide range of alternative conveyor rollers of different sizes, shapes and configurations. For example, in some applications, the conveyor roller may be a dead shaft roller having integrated bearings that provide rotation of an outer shell relative to an internal shaft. In other applications, the conveyor roller may have a live shaft in which the internal shaft and outer shell are fixed together and the conveyor roller rotates through the use of external bearing assemblies that support opposite ends of the shaft. Other features and components of the conveyor roller 20 will not be described in detail because such technology is generally well known.

In the illustrated embodiment, conveyor roller 20 is a dead shaft roller and the core 1 includes a shaft 22, a tubular outer shell 24 and a pair of bearing assemblies 26. The shaft 22 is configured to be fixedly (non-rotationally) mounted to the frame F supporting the roller conveyor assembly RCA (See, for example, FIG. 8). The outer shell 24 is disposed concentrically about the shaft 22 and is rotatably coupled to the shaft 22 by the bearing assemblies 26. In this embodiment, the bearing assemblies 26 are operatively fitted in a conventional manner between the shaft 22 and the outer shell 24 at or near opposite ends of the outer shell 24 to facilitate rotation of the outer shell 24 about the shaft 22. To accommodate installation of the rolling element assemblies 28 (described in more detail below), the outer shell 24 defines a plurality of openings 40 that are each sized and shaped to closely receive a rolling element assembly 28. More specially, each opening 40 corresponds with the cross-sectional shape of the housing 3. In alternative applications, the construction of the conveyor roller 20 may be varied to accommodate different rolling elements and/or different rolling element assemblies.

In the illustrated embodiment, the rolling element 2 generally includes a shaft 32 and a roller 34. The shaft 32 of the illustrated embodiment is a dead shaft in the sense that it is fixed and does not rotate with the roller 34. In alternative embodiments, the shaft 32 may be a live shaft that is configured to rotate with the roller 34. The shaft 32 and the roller 34 may be separately manufactured from the desired materials and the two components may be assembled to form the rolling element 2. In applications of this type, the shaft 32 may be metal and the roller 34 may be injection molded from plastic. If desired, a plastic that is highly lubricious may be used to form the roller, such as PTFE or ultra-high-molecular weight polyethylene (UHMW-PE), to facilitate rotation of the roller 34 about the shaft 32, though other plastics may be suitable depending on the application. In some embodiments, the shaft 32 and the roller 34 may be a one-piece unitary structure. For example, the shaft 32 and the roller 34 may be molded simultaneously from a common material in a single injection molding step or they may be molded from different materials in sequential steps, such as by injection molding the shaft from a first material and subsequentially injection molding the roller in place onto the shaft from a second material. As another example, the shaft may be pre-manufactured and the roller may injection molded in place about the shaft. These are merely examples and the rolling element 2 may be manufactured using essentially any suitable manufacturing techniques and apparatus. In applications that include a live shaft rolling element, opposite ends of the shaft 32 may be supported by bearings, bushings or other low friction elements to facilitate rotation of the shaft 32.

As shown in FIG. 2, the rollers 34 are configured to protrude partially above the outer shell 24 and to provide a contact surface that is generally parallel to the surrounding exposed surface of the outer shell 24. This is merely exemplary and the size, shape and configuration of the roller 34 may also vary from application to application. For example, the height of the roller 34 above the outer shell 24 and/or the length of the roller 34 may be varied. As another example, the exposed surface of the roller 34 may have a different shape that is not parallel with the outer shell 34.

In the illustrated embodiment, each secondary rolling element 2 is integrated into an associated rolling element assembly 28 that is, in this embodiment, a self-contained unit that can be mounted to the conveyor roller 20. In the illustrated embodiment, all of the rolling element assemblies 28 are essentially the same and each one interfaces with the conveyor roller 20 in essentially the same manner—meaning that they can be interchangeably mounted anywhere along the conveyor roller 20. In alternative applications, the rolling element assemblies 28 and the mounting structure may vary from location to location. The use of self-contained rolling element assemblies may provide advantages in some applications, but the rolling element 2 may be integrated into the conveyor roller 20 using alternative structure. For example, each rolling element 2 may be mounted directly to the conveyor roller 20 and not integrated into a rolling element assembly 28.

In the illustrated embodiment, each rolling element assembly 28 includes a housing 3 and a rolling element 2 (with the illustrated rolling element 2 including a shaft 32 and a roller 34). The illustrated housing 3 is generally rectangular and forms a well of sufficient depth to receive a majority of the rolling element 2. The illustrated housing 3 also includes a tapered flange 7 surrounding the mouth of the housing 3 and configured to be seated in the surface of the outer shell 24 when installed. For example, the illustrated housing 3 includes a continuous flange 7 that extends about the periphery of the housing 3 and that, when installed in the conveyor roller 20, is recesses into and flush with the exposed face of the outer shell 24. The flange 7 is tapered to prevent it from being pushed through the opening 40 into the interior of the outer shell 24. In the illustrated embodiment, the opening 40 is configured with a matching taper that allows the flange 7 to be fitted flush into the opening 40. The illustrated taper is merely exemplary and the angle of the taper of the flange and the opening may vary from application to application. It should also be understood that the illustrated flange is merely exemplary and that the size, shape and configuration of the flange may vary from application to application. For example, the flange may be discontinuous or it may be larger or smaller. In alternative applications, the flange 7 may interface differently with the outer shell 24. For example, in some applications, the flange may fully or partially overlap the face of the outer shell 24. As another example, the periphery of each opening 40 in the outer shell 24 may be countersunk to receive all or a portion of the flange 7.

In the illustrated embodiment, each rolling element assembly 28 is configured to be snap-fitted into place within an opening 40 in the conveyor roller 20, though the rolling element assemblies may be secured to the conveyor roller in other ways in alternative embodiments. To provide the snap-fit configuration, the illustrated housing 3 includes a pair of outwardly extending locking protrusions 9 that are designed to interface with the outer shell 24 of the conveyor roller 20. As shown, for example, in FIGS. 3 and 4, the locking protrusions 9 extend outwardly from the housing 3. The locking protrusions 9 of the illustrated embodiment are shaped to facilitate insertion into the opening 40 while resisting removal. For example, the locking protrusions may have a somewhat pyramid-like shape with tapered surfaces as shown. The degree of taper may vary from surface to surface and from application to application. For example, the inwardly facing surface may be longer and have a more gradual taper (to facilitate insertion into the opening) and the outwardly facing surface may be at a more abrupt angle to help retain the rolling element assembly 28 in the outer shell 24. In the illustrated embodiment, the housings 3 are manufactured from suitable plastic or polymeric materials using generally conventional injection molding techniques and apparatus. In alternative embodiments, the housings may be manufactured from essentially any alternative materials suitable for the application using corresponding manufacturing techniques and apparatus.

In some applications, the rolling element assemblies 28 may be sized to abut the shaft 22 extending through the center of the conveyor roller 20 or some other structure inside the conveyor roller 20. This may help to provide structural support to the rolling element assembly 28 by resisting inward movement of the assembly 28 relative to the outer shell 24. This option may be more practical in the context of live shaft conveyor rollers 20 and/or dead shaft conveyor rollers in which the shaft has a circular cross section.

Figure 3:
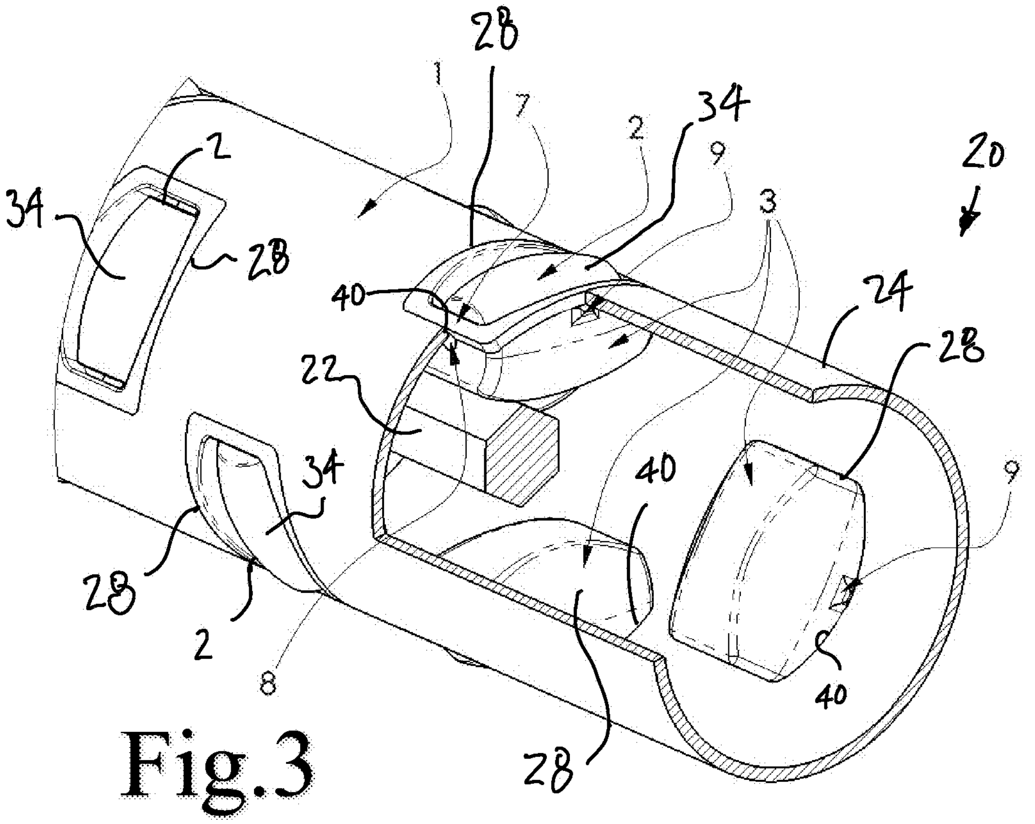
FIG. 3 is a cut-away view of the multi-directional roller with rolling element assemblies according to a first embodiment.
Figure 4:
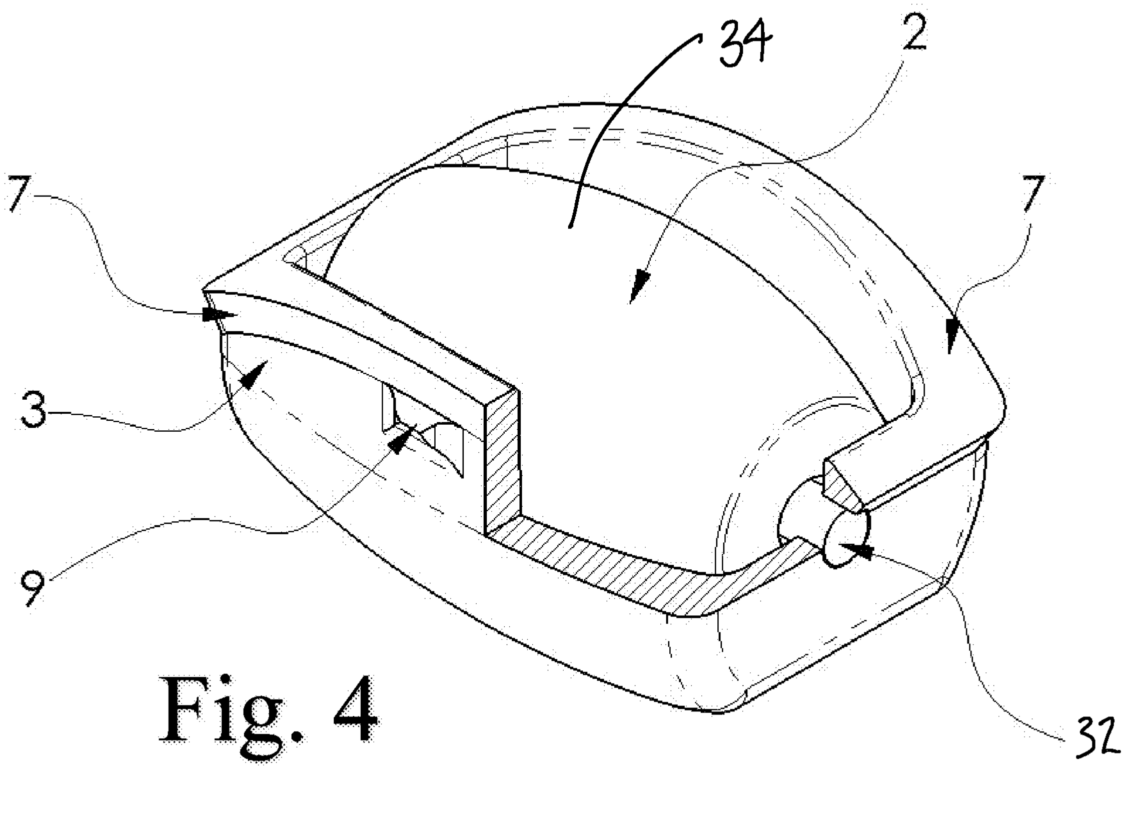
FIG. 4 is a cut-away view of the rolling element assembly according to a first embodiment.

In the embodiment shown in FIG. 3, each rolling element assembly 28 is installed in the outer shell 24 by pushing it into an opening 40 in the roller core 1 until it snaps into place. Features (e.g., the locking protrusions 9) on the housing 3 are designed to flex inward, allowing them to fit through the opening 40 in the roller core, and return to the original position once in place within the roller core 1. These features prevent the assembly from falling out of the roller as it rotates. Flange elements 7 on the upper portion of the housing prevent the assembly from falling further into the opening 40 and provide the means of supporting the product load. In the present embodiment as shown in FIG. 4, each rolling element 2 rotates about a fixed axle 32 fitted into a housing 3. Each housing 3 contains a single rolling element 2, but that may vary in alternative applications. The illustrated rolling element assembly 28 is merely exemplary. The design and configuration of the illustrated rolling element 2 and the rolling element assembly 28 may vary from application to application (and potentially from location to location on the same conveyor roller). Further, the manner of securing the rolling element assembly 28 in the conveyor roller 20 may vary from application to application. For example, the rolling element assembly 28 may be secured using alternative structure, such as alternative snap-fit components (e.g., spring plunger(s)), fasteners, chemical attachment, welding and/or adhesives.

Figure 5:
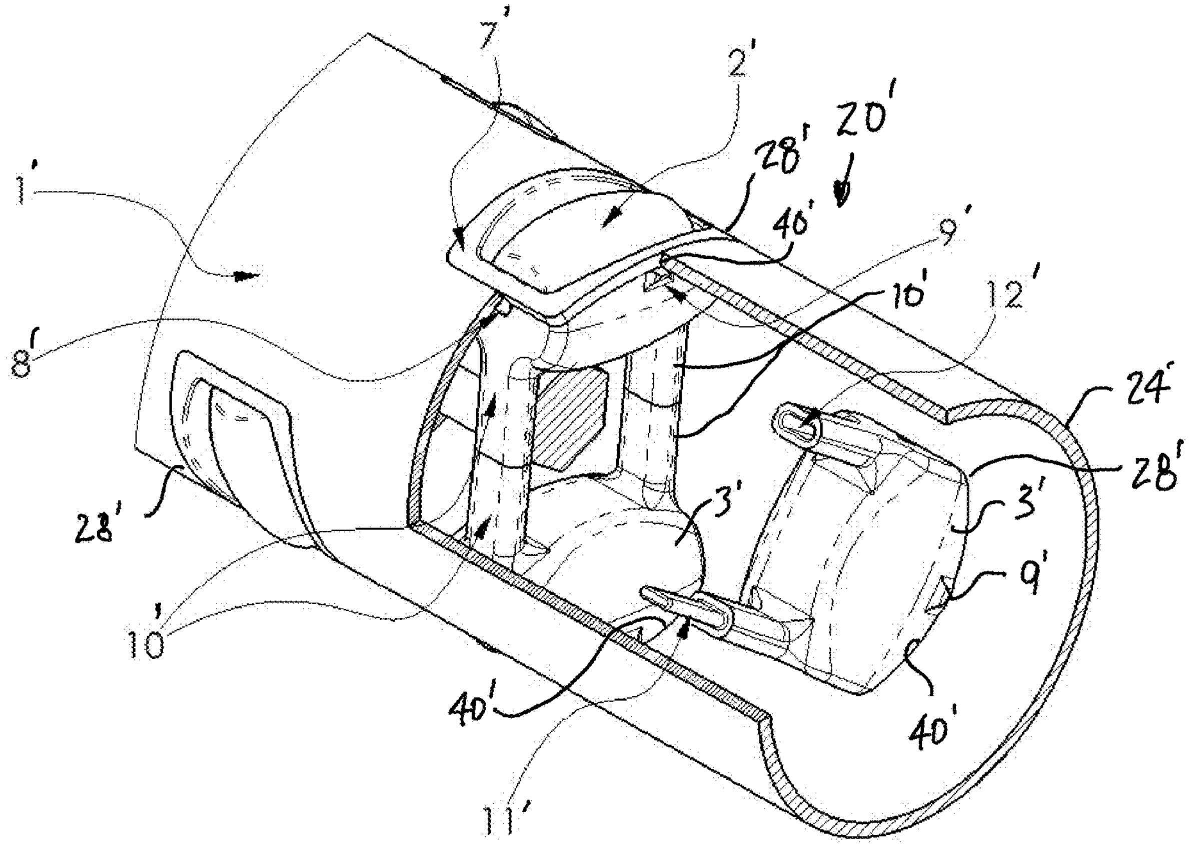
FIG. 5 is a cut-away view of an alternative multi-directional roller with rolling element assemblies according to a second embodiment.
Figure 6:
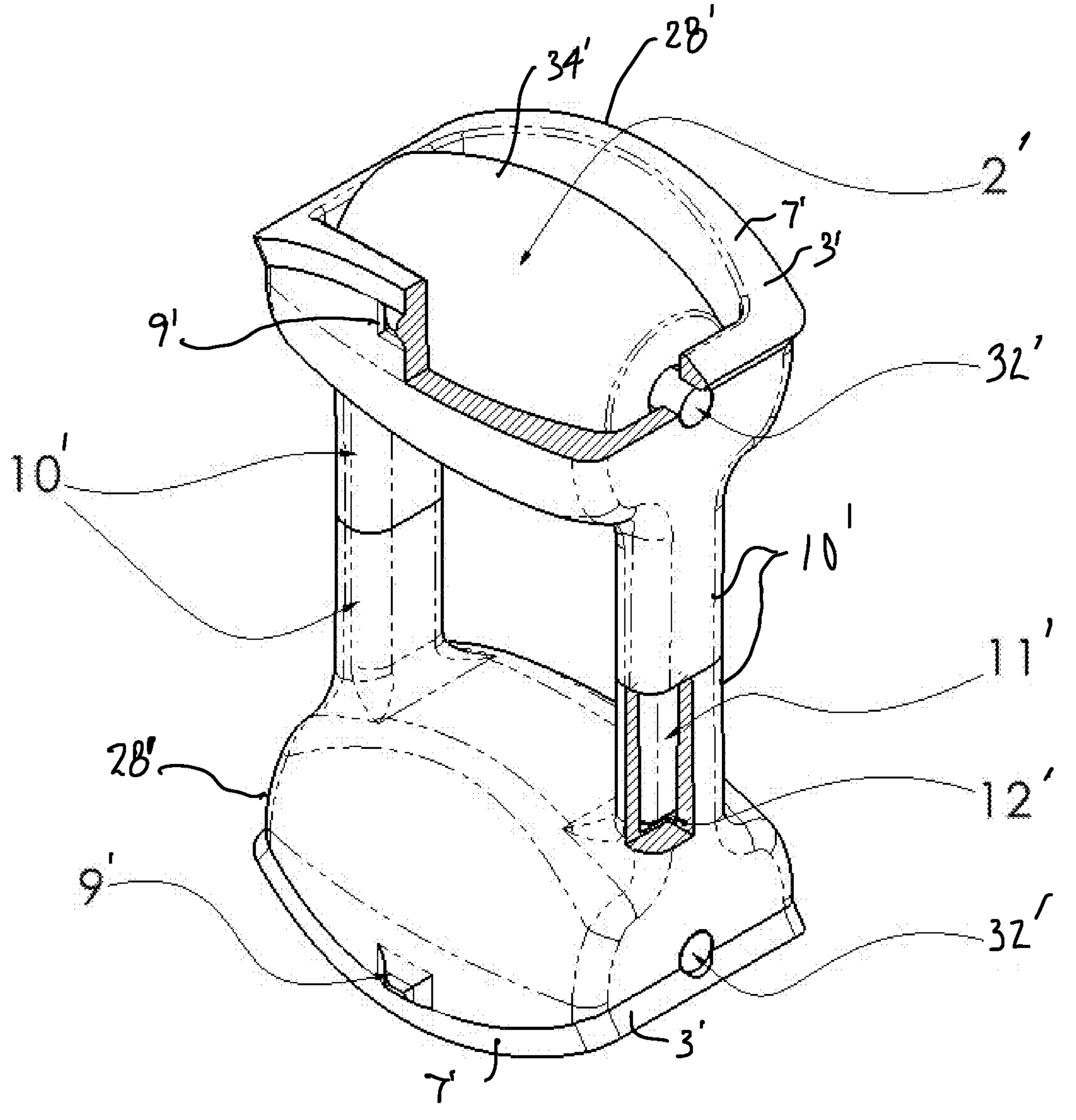
FIG. 6 is a cut-away view of an alternative rolling element assembly according to a second embodiment.

A second embodiment of the invention as shown in FIG. 5 and FIG. 6, features rolling element assemblies 28' with additional extensions 10' on the bottom of the housing 3' that allow two identical housings 30' to snap together within the roller core 1'. In this embodiment, the two identical housings 30' are fitted into the outer shell 24' from opposite sides and are fitted about the shaft 22'. The housing extensions 10' feature a tab 11' or slot 12' that mate with the tab 11' or slot 12' from an identical housing 3' on the opposite side of the roller core. The tab 11' and slot 12' may, in some applications, be configured to interconnect to help retain the connection between the two housing extensions 10' of adjoining rolling element assemblies 28'. For example, the tab 11' of one housing extension 10' may friction fit within the slot 12' of another or the tab 11' and slot 12' may include snap-fit features (such as a recess and a mating protrusion) that allow them to interlock with one another in a way that resists separation. This embodiment adds additional strength and may be particularly useful when heavy products are being conveyed and/or when impact loading may occur. When mated together, the product load on one assembly 28' can be transferred to the second assembly 28', and both components can share in supporting the product load. The illustrated housing extensions 10' are merely exemplary and they may vary from application to application. For example, the size, shape, configuration of the extensions 10' may vary. In alternative applications, the connection mechanism may also vary. The number of rolling elements that interconnect may vary from application to application. For example, the housing extensions may be configured to allow three or four rolling element assemblies arranged symmetrically about the conveyor roller 20' to be interconnected.

Figure 7:
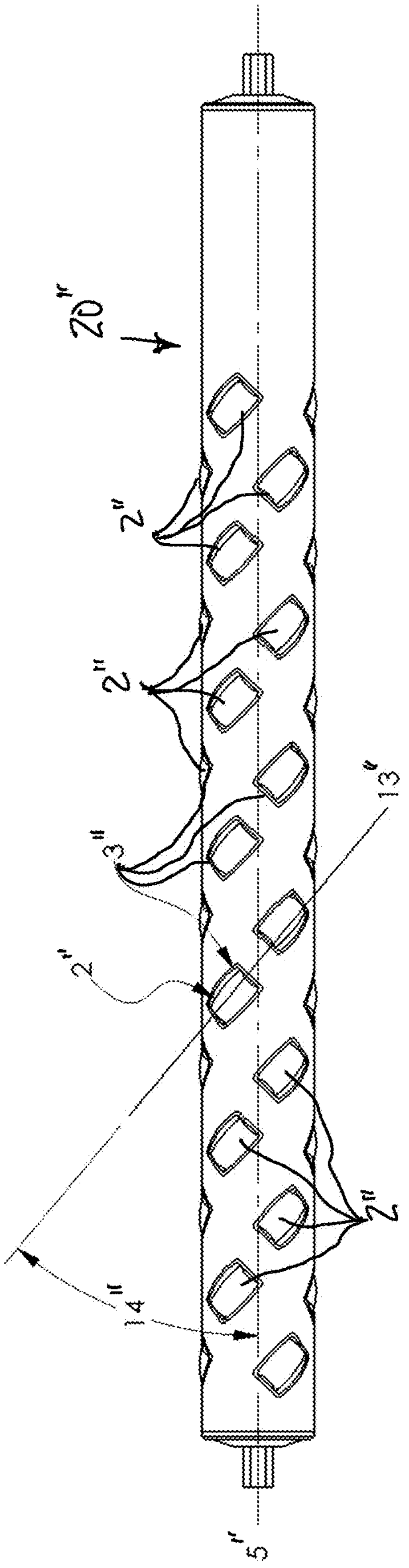
FIG. 7 is a top view of another alternative multi-directional roller with rolling element assemblies according to a third embodiment.
Figure 8:
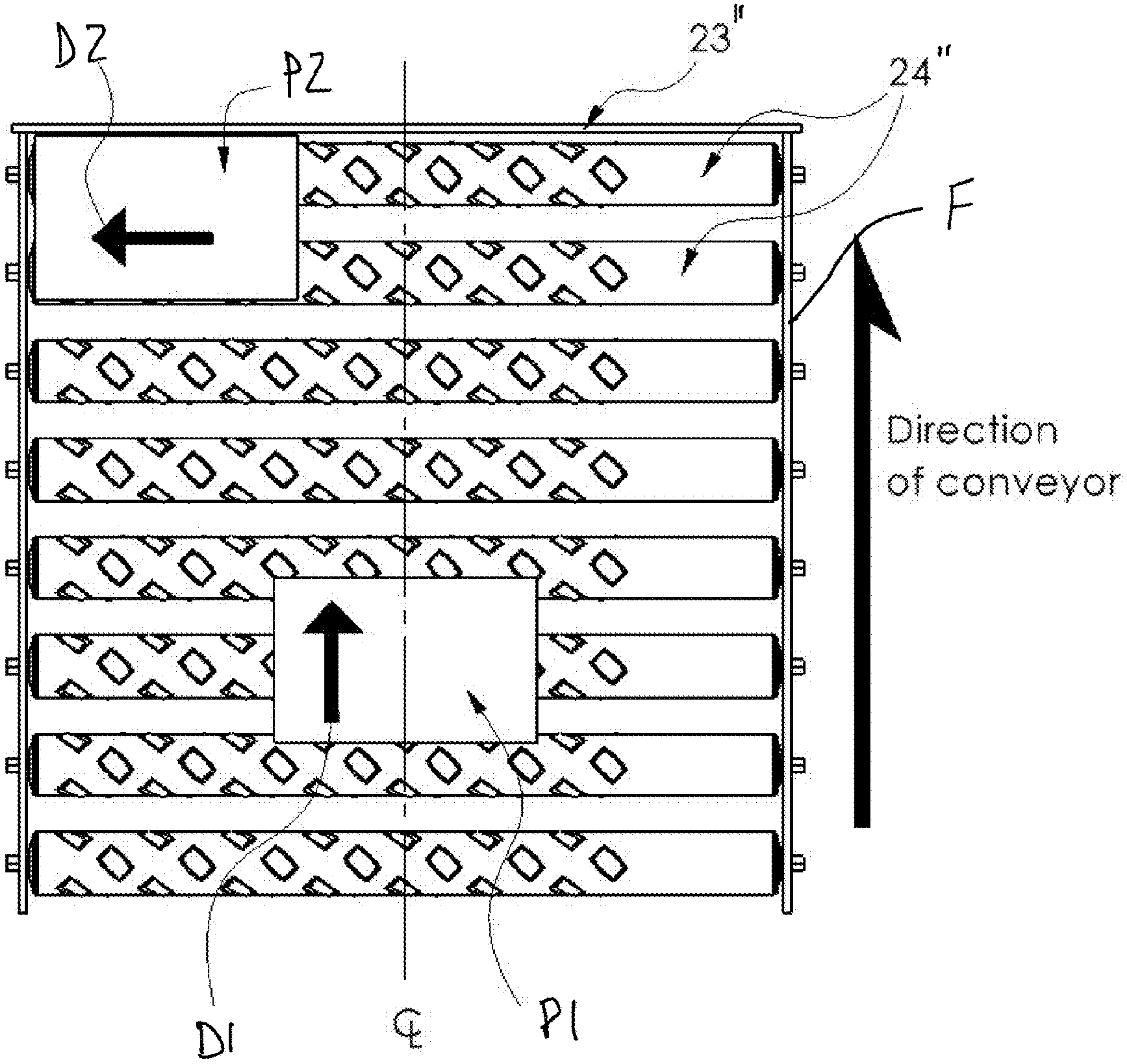
FIG. 8 is a top view of a conveyor with conveyor rollers from FIG. 7 illustrating operation when configured as a diverter.

A third embodiment of the invention is shown in FIGS. 7 and 8, and features rolling elements 2" oriented so the axis of rotation 13" is at an oblique angle to the axis of rotation 14" of the conveyor roller 20". This embodiment is particularly useful in driven-roller conveyors with some method of halting a product's forward motion as shown in FIG. 8, though it may be useful in other applications. When no other force is acting on conveyed product P1 it will travel down the conveyor in the direction of flow D1 with little movement of the rolling elements 2". When the product P2 is blocked from traveling down the conveyor by a stop 23", the supporting rollers 24" underneath the product P2, continue to rotate which causes the rolling elements 2" to rotate against the product's P2 bottom surface. The rolling element's 2" oblique angle of rotation causes a first portion of the rotation to counter the rotation of the conveyor roller 20" and decrease backline pressure on the product. A second portion of the rotation imparts a lateral force against the product P2 causing it to move sideways in the direction of arrow D2 along the face of the stop 23". The illustrated oblique angle is merely exemplary and the rolling elements 2" may be oriented at essentially any angle relative to the axis of rotation of the conveyor roller 24". In some applications, the angle of the rolling elements 2" may vary along the length of the conveyor roller 24". For example, the rolling elements 2" on one opposite halves of the conveyor roller 24" may be oriented in different directions to move products off to the left or right depending on their position on the conveyor rollers 24".

The preferred embodiment as described is snap-in, but others may be chemically bonded or mated to the core in some other fashion. The preferred embodiment as described is made from an injection molded plastic, but others may be made with other materials or with other manufacturing methods, depending on specific application needs. The preferred embodiment as described has single piece rolling elements made with a homogenous material, but others may be made with a two-piece design that includes a harder inner portion that promotes easy rotation, and an outer portion made of another material that provides application specific benefits when contacting products. The preferred embodiment uses a separate metal shaft for the axle of the rolling element, but others may have a plastic shaft that is incorporated into the design of the housing. The preferred embodiment is designed around the industry standard 1.9" diameter conveyor rollers but could easily be scaled to smaller or larger diameter roller applications. The preferred embodiment as shown in FIG. 1 features rolling elements arranged in a pattern that strikes a balance between tube strength and functionality. This pattern is intended to be modified according to the needs of a specific application.

What is claimed is:

1. A conveyor roller comprising:
a shaft extending along a primary axis;
a roller core rotatably supported on the shaft by bearings disposed adjacent opposite ends of the roller core, the roller core including a conveying surface, the conveying surface being rotatable about the primary axis; and
a plurality of freely rotatable rolling elements installed within and supported by the roller core, each of the rolling elements being freely rotatable about an axis different from the primary axis of the roller core, the rolling elements being mounted to the roller core such that a load applied to the rolling elements is transmitted by the roller core to the shaft.

2. The conveyor roller of claim 1 wherein the rolling elements are arranged in a regular pattern about a circumference of the roller core and along a length of the roller core.

3. The conveyor roller of claim 2 wherein each of the rolling elements extends above the conveying surface.

4. The conveyor roller of claim 3 wherein the rolling elements are mounted within a housing that mates with the roller core.

5. The conveyor roller of claim 4 wherein each of the rolling elements is rotatable about an axis perpendicular to the primary axis.

6. The conveyor roller of claim 4 wherein each of the rolling elements is rotatable about an axis oblique to the primary axis.

7. The conveyor roller of claim 2 wherein the rolling elements are arranged in pairs about a circumference of the roller core and a length of the roller core with no more than one pair of rolling elements situated along a single circumference of the roller core.

8. A conveyor roller comprising:
a roller core including a conveying surface, the conveying surface being rotatable about a primary axis; and
a plurality of rolling elements installed within the roller core, each of the rolling elements being rotatable about an axis different from the primary axis of the roller core;
wherein the rolling elements are arranged in a regular pattern about a circumference of the roller core and along a length of the roller core with no more than two rolling elements situated along a single circumference of the roller core.

9. A conveyor roller comprising:
a roller core including a conveying surface, the conveying surface being rotatable about a primary axis; and
a plurality of rolling elements installed within the roller core, each of the rolling elements being rotatable about an axis different from the primary axis of the roller core;
wherein each rolling element is rotatably mounted within a housing to define a rolling element assembly;
wherein each housing includes at least one housing extension; and
wherein the rolling element assemblies are mounted in pairs with the housing extension of one of the pair of rolling element assemblies being engaged with the housing extension of the other of the pair of rolling element assemblies.

10. A conveyor roller assembly comprising:
a plurality of conveyor rollers positioned side by side;
a first one of the conveyor rollers including:
a first shaft extending along a first primary axis;
a first outer shell forming a first primary rolling element, the first outer shell being rotatably supported on the first shaft by bearings disposed adjacent opposite ends of the first outer shell and being rotatable about the first primary axis; and
a plurality of first secondary rolling elements installed within the first outer shell, each of the first secondary rolling elements being freely rotatable about an axis different from the first primary axis, the first secondary rolling elements being mounted to the first outer shell such that a load applied to the first secondary rolling elements is transmitted by the first outer shell to the first shaft; and
a second one of the conveyor rollers including:
a second shaft extending along a second primary axis;
a second outer shell forming a second primary rolling element, the second outer shell being rotatably supported on the second shaft by bearings disposed adjacent opposite ends of the first outer shell and being rotatable about the second primary axis; and
a plurality of second secondary rolling elements installed within the second outer shell, each of the second secondary rolling elements being freely rotatable about an axis different from the second primary axis, the second secondary rolling elements being mounted to the second outer shell such that a load applied to the second secondary rolling elements is transmitted by the second outer shell to the second shaft; and
wherein the first one of the conveyor rollers is disposed adjacent to the second one of the conveyor rollers, whereby the first one of the conveyor rollers and the second one of the conveyor rollers cooperate to define a product conveying surface.

11. The conveyor roller assembly of claim 10 wherein the plurality of first secondary rolling elements are arranged in a regular pattern about a circumference of the first outer shell and along a length of the first outer shell; and wherein the plurality of second secondary rolling elements are arranged in a regular pattern about a circumference of the second outer shell and along a length of the second outer shell.

12. The conveyor roller assembly of claim 10 wherein each of the plurality of first secondary rolling elements is rotatably disposed within a housing; and wherein each housing is fitted into a corresponding opening in the outer shell of the first one of the conveyor rollers.

13. The conveyor roller assembly of claim 12 wherein each housing is snap-fitted into a corresponding opening in the outer shell of the first one of the conveyor rollers.

14. The conveyor roller assembly of claim 13 wherein each housing includes a flange operatively engaged with the outer shell about an opening.

15. The conveyor roller assembly of claim 14 wherein each of the plurality of first secondary rolling elements includes an axle and a roller, the roller being disposed about the axle, the axle being rotatably received within a housing.

16. The conveyor roller assembly of claim 15 wherein each of the housings are identical and are configured to be seated in any one of the openings.

17. The conveyor roller assembly of claim 16 wherein each of the housings includes at least one extension;

wherein each rolling element is rotatably mounted within a corresponding housing to define a rolling element assembly; and wherein the rolling element assemblies are mounted in pairs, with the housing extension of one of the pair of rolling element assemblies being engaged with the housing extension of the other of the pair of rolling element assemblies.

18. A conveyor roller assembly comprising:

a plurality of conveyor rollers positioned side by side;

a first one of the plurality of conveyor rollers including:

a first outer shell forming a first primary rolling element, the first outer shell being rotatable about a first primary axis; and a plurality of first secondary rolling elements installed within the first outer shell, each of the first secondary rolling elements being rotatable about an axis different from the first primary axis; and a second one of the plurality of conveyor rollers including:

a second outer shell forming a second primary rolling element, the second outer shell being rotatable about a second primary axis; and a plurality of second secondary rolling elements installed within the second outer shell, each of the second secondary rolling elements being rotatable about an axis different from the second primary axis;

wherein the first one of the plurality of conveyor rollers is disposed adjacent to the second one of the plurality of conveyor rollers, whereby the first one of the plurality of conveyor rollers and the second one of the plurality of conveyor rollers cooperate to define a product conveying surface;

wherein the plurality of first secondary rolling elements are arranged in a regular pattern about a circumference of the first outer shell and along a length of the first outer shell;

wherein the plurality of second secondary rolling elements are arranged in a regular pattern about a circumference of the second outer shell and along a length of the second outer shell;

wherein the plurality of first secondary rolling elements are arranged in pairs about the circumference of the first outer shell and along the length of the first outer shell; and wherein the plurality of second secondary rolling elements are arranged in pairs about the circumference of the second outer shell and along the length of the second outer shell.

19. A conveyor roller comprising:

a shaft extending along a primary axis;

an outer shell disposed concentrically relative to the shaft, the outer shell being rotatably supported on the shaft by bearings disposed adjacent opposite ends of the outer shell, the outer shell having an outer circumferential surface to support a product carried by the conveyor roller and rotatable about the primary axis, the outer shell defining a plurality of openings; and a plurality of freely rotatable secondary rolling elements mounted within and supported by the outer shell, the plurality of secondary rolling elements being arranged in a regular pattern about a circumference of the outer shell and along a length of the outer shell, each of the secondary rolling elements including a shaft and a roller, the roller protruding above the outer circumferential surface of the outer shell and being oriented to freely rotate about an axis different from the primary axis, the secondary rolling elements being mounted to the outer shell such that a load applied to the secondary rolling elements is transmitted by the outer shell to the shaft.

20. The conveyor roller of claim 19 wherein each of the plurality of secondary rolling elements is rotatably mounted in a housing, each housing being secured within a corresponding one of the openings in the outer shell.

* * * * *